(12) United States Patent
Garripoli et al.

(10) Patent No.: US 12,062,923 B2
(45) Date of Patent: Aug. 13, 2024

(54) WIRELESS POWER TRANSMISSION USING TRANSMITTER PHASE CONTROL

(71) Applicant: Stichting IMEC Nederland, Wageningen (NL)

(72) Inventors: Carmine Garripoli, Eindhoven (NL); Stefano Stanzione, Veldhoven (NL); Marco Mercuri, Eindhoven (NL)

(73) Assignee: Stichting IMEC Nederland, Wageningen (NL)

( * ) Notice: Subject to any disclaimer, the term of this patent is extended or adjusted under 35 U.S.C. 154(b) by 0 days.

(21) Appl. No.: 17/550,331

(22) Filed: Dec. 14, 2021

(65) Prior Publication Data

US 2022/0200349 A1  Jun. 23, 2022

(30) Foreign Application Priority Data

Dec. 17, 2020 (EP) ..................................... 20214809

(51) Int. Cl.
*H02J 50/12* (2016.01)
*H02J 50/10* (2016.01)
*H02J 50/40* (2016.01)
*H04B 5/79* (2024.01)

(52) U.S. Cl.
CPC .............. *H02J 50/12* (2016.02); *H02J 50/10* (2016.02); *H02J 50/402* (2020.01); *H04B 5/79* (2024.01)

(58) Field of Classification Search
None
See application file for complete search history.

(56) References Cited

U.S. PATENT DOCUMENTS

| 6,223,061 B1 * | 4/2001 | Dacus ...................... H03L 7/14 |
| | | 455/574 |
| 9,031,180 B2 | 5/2015 | Rahul et al. |
| 9,118,203 B2 | 8/2015 | Davis |
| | (Continued) | |

FOREIGN PATENT DOCUMENTS

WO    WO-2019195882 A1    10/2019

OTHER PUBLICATIONS

Dadras, S. and Malek, H., "Real-Time Coupling Coefficient Estimation for Inductive Power Transfer Systems," SAE Technical Paper 2017-01-1608, 2017, https://doi.org/10.4271/2017-01-1608.

(Continued)

*Primary Examiner* — Adi Amrany
(74) *Attorney, Agent, or Firm* — MOSER TABOADA

(57) ABSTRACT

A powering apparatus for wireless powering of a power receiving device comprises:
 a plurality of power transmitters configured to provide inductive coupling to the power receiving device; and
 an oscillator configured to provide a reference oscillator signal;
 wherein each power transmitter comprises an inductive element and a driving circuitry for providing a current signal for driving the inductive element, wherein the driving circuitry of each power transmitter is configured to receive the reference oscillator signal and a feedback signal of a current through the inductive element for controlling a phase of the current signal in relation to a phase of the reference oscillator signal, each of the plurality of power transmitters being configured for outputting a powering signal controlled by a common phase relation to the reference oscillator signal.

11 Claims, 4 Drawing Sheets

(56) References Cited

U.S. PATENT DOCUMENTS

| | | | |
|---|---|---|---|
| 9,473,209 | B2 | 10/2016 | Cooper et al. |
| 9,953,763 | B2 | 4/2018 | Uchida et al. |
| 10,122,222 | B2 | 11/2018 | Hansen et al. |
| 10,193,396 | B1 | 1/2019 | Bell et al. |
| 10,418,856 | B2 | 9/2019 | Adolf et al. |
| 10,447,079 | B2 | 10/2019 | Wagman et al. |
| 10,547,207 | B2 | 1/2020 | Wang et al. |
| 11,309,901 | B2* | 4/2022 | Påhlsson ................. H03L 7/091 |
| 2010/0033021 | A1 | 2/2010 | Bennett |
| 2011/0153244 | A1* | 6/2011 | Rocha Alves, Jr. ........................ G01R 19/2513 702/72 |
| 2012/0013376 | A1* | 1/2012 | Thacker ................. H03L 7/085 327/156 |
| 2012/0161533 | A1* | 6/2012 | Urano ..................... H02J 50/80 307/104 |
| 2013/0342023 | A1* | 12/2013 | Li ........................... H02J 50/10 307/104 |
| 2014/0028111 | A1 | 1/2014 | Hansen et al. |
| 2015/0063517 | A1* | 3/2015 | Verlinden ............. H03L 7/0992 375/376 |
| 2015/0377934 | A1* | 12/2015 | Choe ....................... H02B 1/44 324/126 |
| 2016/0064943 | A1 | 3/2016 | Ku et al. |
| 2016/0294398 | A1* | 10/2016 | Verlinden ............... H03L 7/087 |
| 2017/0063143 | A1 | 3/2017 | Hoarau et al. |
| 2017/0104369 | A1* | 4/2017 | Petersen ................. H02J 50/12 |
| 2017/0373540 | A1* | 12/2017 | Guidi ..................... H01F 38/14 |
| 2018/0097521 | A1* | 4/2018 | Hammerschmidt .. H03L 7/0805 |
| 2018/0159382 | A1 | 6/2018 | Lin et al. |
| 2018/0337683 | A1* | 11/2018 | Mateman ................ H03L 7/081 |
| 2019/0068001 | A1* | 2/2019 | Lovas ..................... H02J 50/10 |
| 2019/0257893 | A1* | 8/2019 | Na ......................... G01R 19/165 |
| 2019/0288560 | A1* | 9/2019 | Baarman .............. H04B 5/0037 |
| 2019/0379240 | A1 | 12/2019 | Liu |
| 2021/0175728 | A1* | 6/2021 | Wang .................... H02J 7/0047 |

OTHER PUBLICATIONS

Agbinya, Johnson. (2018). Recursive Frequency Allocation Scheme in Wireless Power Transfer and Magnetic Induction Communication Systems. Wireless Personal Communications. 98. 10.1007/s11277-017-4864-1.

M. R. V. Moghadam and R. Zhang, "Node Placement and Distributed Magnetic Beamforming Optimization for Wireless Power Transfer," in IEEE Transactions on Signal and Information Processing over Networks, vol. 4, No. 2, pp. 264-279, Jun. 2018, doi: 10.1109/TSIPN.2017.2689683.

Anyapo et al., "Phase_Shift Phase-Lock Loop (PLL) Control for Wireless Power Transmission System using Primary-Side Information", $5^{th}$ International Electrical Engineering Congress, Pattay, Thailand, Mar. 8-10, 2017, pp. 1-4.

Jayathurathnage, et al., "Effects of Adjacent Transmitter Current for Multi-Transmitter Wireless Power Transfer", IEEE, pp. 1-4.

Kim et al., "Maximum Efficiency Point Tracking for Multiple-Transmitters Wireless Power Transfer", DOI.10.1109/TPEL.2019293, IEEE, pp. 1-10.

Agarwal, et al., "Wireless Power Transfer Strategies for Implantable Bioelectronics", IEEE Reviews in Biomedical Engineering, vol. 10, 2017, pp. 136-161.

Jung et al., "Optimization of Magnetic Field Focusing and Null Steering for Selective Wireless Power Transfer", IEEE Transactions On Power Electronics, vol. 35, No. 5, May 2020, pp. 4622-4633.

Xu, et al., "Multi-coil High Efficiency Wireless Power Transfer System against Misalignment", 2018 IEEE, pp. 1-3.

Jadidian, et al., "Magnetic MIMO: How To Charge Your Phone in Your Pocket", Massachusetts Institute of Technology, pp. 495-506.

Lang, et al., "Convex Optimization of Wireless Power Transfer Systems With Multiple Transmitters", IEEE Transactions On Antennas and Propagation, vol. 62, No. 9, Sep. 2014, pp. 4623-4636.

European Search Report for Application No. EP20214809-4 dated May 21, 2021.

* cited by examiner

WIRELESS POWER TRANSMISSION USING TRANSMITTER PHASE CONTROL

CROSS-REFERENCE TO RELATED APPLICATIONS

This application claims benefit of EPC Application No. 20214809.4 filed on Dec. 17, 2020, which is herein incorporated by reference in its entirety.

TECHNICAL FIELD

The present inventive concept relates to wireless powering of a power receiving device. In particular, the present inventive concept relates to a powering apparatus and to a method for controlling a powering apparatus.

BACKGROUND

A powering apparatus may be used for providing power to a device, here called a power receiving device as it will receive power from the powering apparatus. The powering apparatus may be configured to charge a battery of a battery-powered device or to continuously provide power to the power receiving device. The powering of the power receiving device ensures that the power receiving device remains operational.

Wireless powering by means of the powering apparatus is useful in numerous applications. By using wireless powering, a wire between the powering apparatus and a power receiving device is not needed so as to provide a convenient or practical manner of powering the power receiving device. Also, in some instances, it is not possible to use a wire for powering, such as when the power receiving device is arranged in a body of a person as an implanted or ingested device. Then, wireless powering can be used in order to enable a prolonged lifetime of the implanted or ingested device.

Wireless powering by means of inductive coupling uses loops, or coils, to transfer energy via a magnetic field from the powering apparatus to the power receiving device. Using a single transmitter-receiver configuration, i.e. a single transmitter at the powering apparatus and a single receiver at the power receiving device, an efficiency of energy transfer is strongly affected by a misalignment between the transmitter and the receiver. For this reason, multiple transmitters in the powering apparatus may be utilized to compensate for any change in alignment between the transmitter and the receiver.

The multiple transmitters need to be driven in order to achieve constructive interference, and thus good efficiency, at the receiver.

Driving schemes may use power amplifiers that force a certain voltage to a resonant coil of a transmitter. However, when using multiple transmitters, a phase shift in a transmitter between voltage and coil current is influenced by a loading by the receiver and by a coupling of the transmitter with all other transmitters. Therefore, by applying a voltage at the transmitter coil, a phase of the magnetic field used for powering the power receiving device is unknown, unless explicitly measured.

A feedback approach may be used for driving the different transmitters in order to produce a constructive interference at the receiver. The feedback approach may comprise estimating a channel per transmitter to set an initial voltage and phase to be applied to each of the transmitters. Then, the receiver will give feedback on the received power based on such settings and a maximum efficiency point of voltage and phase to be applied to each of the transmitters may be tracked by means of an optimization algorithm. Use of the optimization algorithm is very resource demanding, which leads to large computational power being required for the optimization algorithm, such that a large proportion of power used for powering the power receiving device may be spent on optimizing the powering conditions. In particular, compensation for the receiver changing position or tilt in real-time in relation to the transmitters is not achievable using such optimization algorithms, which compensation may be needed e.g. for transmitters worn by a person for charging an ingested or implanted device. Thus, there is a need for improving powering by means of a powering apparatus comprising plural transmitters.

U.S. Pat. No. 10,122,222 discloses a wireless transmission system for transferring power over a distance. A transmitter can include a plurality of transmitter resonators configured to transmit wireless power to a receiver. The system uses phased arrays of transmitter coils and/or phased arrays of receiver coils to control power transmission. Transmit resonators can be arranged to be in phase or out-of-phase. The polarities of magnetic flux received by the receiver can be measured and communicated to the transmitter, which can adjust polarities of the transmitter resonators to optimize power transfer. Thus, there is a need to perform measurements at the receiver in order to provide feedback for optimizing power transfer. Hence, the system is resource demanding for optimizing power transfer and does further not allow for compensating for fast changes in position or tilt of the receiver.

SUMMARY

An objective of the present inventive concept is to enable efficient wireless powering using multiple transmitters while avoiding a need of resource demanding optimization of the powering.

These and other objectives of the inventive concept are at least partly met by the invention as defined in the independent claim. Preferred embodiments are set out in the dependent claims.

According to a first aspect of the present inventive concept, there is provided a powering apparatus for wireless powering of a power receiving device, said powering apparatus comprising: a plurality of power transmitters configured to provide inductive coupling to the power receiving device; and an oscillator configured to provide a reference oscillator signal; wherein each power transmitter comprises an inductive element and a driving circuitry for providing a current signal for driving the inductive element, wherein the driving circuitry of each power transmitter is configured to receive the reference oscillator signal and a feedback signal of a current through the inductive element for controlling a phase of the current signal in relation to a phase of the reference oscillator signal, each of the plurality of power transmitters being configured for outputting a powering signal controlled by a common phase relation to the reference oscillator signal.

The powering apparatus is configured to ensure constructive interference at the power receiving device, without a need for feedback from the power receiving device. Each power transmitter is configured to control a phase of the current signal driving the inductive element in relation to a phase of the same reference oscillator signal, wherein the power transmitters are configured to provide a common phase relation between the current signal and the reference oscillator signal. This implies that the current signals of each of the power transmitters will be in phase with each other. Since the output magnetic field is in phase with the current through the inductive element, bringing the current signals of the power transmitters in phase to each other implies that the output powering signals (magnetic field) are also in phase.

The powering apparatus is intended to use inductive coupling between power transmitters and the power receiving device. This implies that the power receiving device will be arranged in a near-field relation to the power receiving device. Hence, a distance between the power transmitters and the power receiving device is so small that the powering signal will not change phase between the power transmitter and the power receiving device and, hence, by bringing the output powering signals in phase with each other, the powering signals will also be received in phase by the power receiving device.

The feedback signal used for controlling a phase of the current signal in relation to the reference oscillator signal represents a current through the inductive element. Thus, the feedback signal may be measured within the power transmitter and there is no requirement on receiving input from the power receiving device for determining the feedback signal. This implies that the power transmitters may be controlled in a power efficient manner ensuring that a majority of power resources consumed by the powering apparatus are used for charging the power receiving device and not for controlling the powering apparatus.

Each power transmitter may be configured to be separately controlled for controlling the current signal of the respective power transmitter. However, since each of the power transmitters are configured to receive the same reference oscillator signal, the controlling of the phase of the current signals of the power transmitters in relation to the phase of the reference oscillator signal may be used to ensure that the current signals of all the power transmitters will be in phase. The driving circuitries of the power transmitters may be configured in identical ways, such that the driving circuitries will provide the same phase relationship between the current signals provided by the respective driving circuitries and the reference oscillator signal.

According to an embodiment, the driving circuitry of each power transmitter may be configured to bring the current signal in phase with the reference oscillator signal. This may provide a robust manner of ensuring that the current signals of different power transmitters are in phase, because the driving circuitry may accurately follow the phase of the reference oscillator signal. However, it should be realized that any other relation between the current signal and the reference oscillator signal may be provided, i.e. a phase difference in a range of 0-360°.

Each of the plurality of power transmitters is configured for outputting a powering signal "being controlled by" a common phase relation to the reference oscillator signal should be understood as each of the plurality of power transmitters outputting a powering signal with a common phase relation to the reference oscillator signal or with a 180° phase shift in relation to the common phase relation. The 180° phase shift may be applied to power transmitters whose magnetic flux is in opposite orientation compared to other power transmitters, so as to ensure that the power transmitters provide constructive interference for powering the power receiving device.

A change in position and/or tilt of the power receiving device may affect a loading of the power transmitters. This may be sensed by the feedback signal such that the powering apparatus may very quickly adapt to changes in position and/or tilt of the power receiving device for maintaining output of powering signals in desired phase relation to the reference oscillator signal providing constructive interference at the power receiving device.

Although, as mentioned above, there is not a need for receiving communication from the power receiving device for ensuring constructive interference by the powering signals at the power receiving device, the power receiving device may still be configured to communicate with the powering apparatus for further controlling the powering of the power receiving device.

According to an embodiment, the driving circuitry of each power transmitter comprises a phase locking loop or a delay locking loop for locking the current signal to the reference oscillator signal.

A phase locking loop and a delay locking loop both provide efficient manners of locking a phase of an output signal to an input signal to control the phase relation between the current signal and the reference oscillator signal. Thus, using a phase locking loop or a delay locking loop is a suitable manner of ensuring that the current signal driving the inductive element of the power transmitter is set in phase with the reference oscillator signal.

According to an embodiment, the phase locking loop or the delay locking loop comprises a phase detector, which is configured to receive the feedback signal of the current through the inductive element and the reference oscillator signal and to output a control signal in dependence of a phase difference between the feedback signal and the reference oscillator signal.

Thus, using the phase detector, the difference in phase between the current through the inductive element and the reference oscillator signal can be determined, such that the phase locking loop or delay locking loop may use the difference to ensure that the phase of the reference oscillator signal is followed by the current through the inductive element.

According to an embodiment, the phase locking loop further comprises a voltage controlled oscillator, which is configured to receive the control signal from the phase detector and is configured to generate the current signal for driving the inductive element or the delay locking loop may further comprise a delay unit, which is configured to receive the control signal from the phase detector and is configured to provide a delay based on the control signal for bringing the current signal for driving the inductive element.

The voltage controlled oscillator may thus based on the control signal from the phase detector ensure that the current signal is held in phase with the reference oscillator signal.

The delay unit may for instance comprise a voltage controlled delay, or a digital delay line for providing the delay. The delay unit may thus, based on the control signal from the phase detector, ensure that the current signal is held in phase with the reference oscillator signal.

According to an embodiment, the phase locking loop or the delay locking loop further comprises an Ampere meter configured to measure the current through the inductive element and to output the feedback signal.

The Ampere meter may conveniently provide a measurement of the current so as to enable forming of the feedback signal to control the power transmitter to bring the current signal in phase with the reference oscillator signal.

Although power transmitters using a phase locking loop or a delay locking loop for bringing the current signal in phase with the reference oscillator signal have been discussed above, it should be realized that the power transmitters may be configured in alternative manners for bringing the current signal in phase with the reference oscillator signal or for controlling a different phase relation between the phase of the current signal and the phase of the reference oscillator signal.

As is evident from the above, a phase detector may be used in a phase locking loop and in a delay locking loop. It should also be realized that the phase detector may be used in another circuitry configured to set a controlled relation of the phase of the current signal and the phase of the reference oscillator signal, without the current signal and the reference oscillator signal necessarily being in phase with each other. Thus, according to an embodiment, the driving circuitry of each power transmitter may comprise a phase detector, which is configured to receive the feedback signal of the current through the inductive element and the reference oscillator signal and to output a control signal in dependence of a phase difference between the feedback signal and the reference oscillator signal. The presence of a phase detector in the driving circuitry is not tied to a particular implementation of the driving circuitry.

As is further evident from the above, an Ampere meter may be used in a phase locking loop and in a delay locking loop. It should also be realized that the Ampere meter may be used in another circuitry configured to set a controlled relation of the phase of the current signal and the phase of the reference oscillator signal, without the current signal and the reference oscillator signal necessarily being in phase with each other. Thus, according to an embodiment, the driving circuitry of each power transmitter may comprise an Ampere meter configured to measure the current through the inductive element and to output the feedback signal. The presence of an Ampere meter in the driving circuitry is not tied to a particular implementation of the driving circuitry.

According to an embodiment, the driving circuitry of each power transmitter may comprise a digital control unit for controlling a phase of the current signal in relation to a phase of the reference oscillator signal.

The digital control unit may comprise a current sensor that is configured to digitally read the current through the inductive element. Thus, the feedback signal may be acquired using the current sensor.

The digital control unit may further comprise a phase controller which is configured to receive the feedback signal and to determine a control signal for changing phase of the current signal for providing a desired phase relation between the current signal and the reference oscillator signal.

It should further be realized that all the power transmitters in the powering apparatus are not necessarily identical. Although manufacturing of the powering apparatus may be simplified by having identical power transmitters, it is conceivable that the power transmitters within the powering apparatus are differently configured for controlling the phase of the current signal in relation to the phase of the reference oscillator signal. Thus, in one embodiment, the powering apparatus may comprise a first group of power transmitters, wherein the driving circuitry of the power transmitters comprises a phase locking loop, and/or a second group of power transmitters, wherein the driving circuitry of the power transmitters comprises a delay locking loop, and/or a third group of power transmitters, wherein the driving circuitry of the power transmitters comprises a digital control unit.

According to an embodiment, the powering apparatus further comprises a power distribution control unit, which is configured to determine an amplitude of the powering signal to be output by each of the power transmitters.

While having the powering signals of the power transmitters in phase allows for constructive interference to be provided, controlling a power distribution may ensure that the power provided by the powering apparatus is properly distributed between the power transmitters to further optimize the efficiency of power transfer to the power receiving device. Thus, thanks to the powering apparatus comprising the power distribution control unit, use of the power provided to the respective power transmitters may be further optimized.

According to an embodiment, the power distribution control unit is configured to determine the amplitude of the powering signals by defining groups of power transmitters among the plurality of power transmitters, and determining an equivalent coupling factor for a virtual combined power transmitter to the power receiving device, wherein the equivalent coupling factor represents a coupling between the power transmitters within a group and the power receiving device with a desired power distribution between the power transmitters within the group, and wherein the desired power distribution is based on coupling factors between each of the power transmitters within the group and the power receiving device and the equivalent coupling factor is based on the coupling factors between each of the power transmitters within the group and the power receiving device and on the desired power distribution.

At least to the knowledge of the inventors, no close-form analytical formula exists for determining the optimal power distribution to be used among a large number of power transmitters used for powering a power receiving device. However, use of an optimization algorithm is resource demanding and consumes substantial power that could otherwise be used for powering the power receiving device. Further, an optimization algorithm may not be very fast and may therefore not be suitable for real-time changes to the power distribution in view of changes in position and/or tilt of the power receiving device. Moreover, an optimization algorithm may settle on a local maximum of power transfer efficiency and may therefore not even find the absolute maximum providing optimal power transfer efficiency.

The power distribution control unit is configured to divide the problem of finding a desired power distribution (for determining the amplitude of the powering signals) between the power transmitters into a number of groups of power transmitters to determine the desired power distribution between the power transmitters in each group.

According to an embodiment, groups of two power transmitters are defined, such that pairs of power transmitters are defined. Using pairs of power transmitters may be particularly useful, because it may be possible to utilize analytical calculations for determining power distribution between the power transmitters in the pair.

The power distribution control unit utilizes that knowledge of the respective coupling factors of a first power transmitter to a power receiving device and a second power transmitter to the power receiving device allows determination of the desired power distribution between the first and the second power transmitter for providing an optimal or good power transfer efficiency of the pair formed by the first and the second power transmitter.

Once the coupling factors and the desired power distribution is known, the pair of power transmitters may be represented as a single virtual combined power transmitter having an equivalent coupling factor. The equivalent coupling factor may be determined using the coupling factors between each of the power transmitters in the pair and the power receiving device and using the desired power distribution. Hence, determination of the equivalent coupling factor for a pair of power transmitters allows the problem of finding the desired power distribution among a number of power transmitters to be reduced by a factor 2 to a number of virtual combined power transmitters.

This reduction of a complexity of the problem of finding a desired power distribution among a number of power transmitters may be performed repeatedly to further reduce the complexity of the problem. Hence, the power distribution control unit is configured to enable very fast determination of an efficient or optimized power distribution by reducing the complexity of the problem in one or more steps. Thus, the determination of the desired power distribution among a large number of power transmitters may further be performed in an efficient manner.

The power distribution control unit may perform the determination using the coupling factor between the power transmitters and the power receiving device, which may be quickly determined for all the power transmitters. Hence, the input needed to the power distribution control unit may be quickly determined without requiring large resources. Thus, the input may be frequently updated to allow updating determination of the desired power distribution so as to handle real-time optimization of the powering of the power receiving device in view of changes in position and/or tilt of the power receiving device.

The determination of the desired power distribution between the power transmitters within a pair may be performed by analytical calculation of the power distribution using the coupling factors between each of the power transmitters within the pair and the power receiving device as input. However, the determination of the desired power distribution may be performed by look-up in a look-up table based on the coupling factors, which may allow the desired power distribution to be determined very quickly.

It should be realized that it is not necessary to determine the actual coupling factor between the power transmitters and the power receiving device, but rather it may be sufficient to determine a relative coupling factor to relate the coupling factor of the first power transmitter to the power receiving device to the coupling factor of the second power transmitter to the power receiving device.

Although it is described above that groups of two power transmitters may be defined, it should be realized that groups of more than two power transmitters may be defined. Even though an analytical representation for calculating power distribution between the power transmitters in the group may not be available, the defining of groups of power transmitters may reduce the problem of finding a desired power distribution among a large number of power transmitters. The power distribution between the power transmitters in the group may be determined numerically instead of analytically. For instance, groups of three power transmitters may be defined, but larger groups of power transmitters may also be conceivably used.

The power control distribution unit is advantageously combined with controlling output of powering signals of the power transmitters to be in phase with the reference oscillator signal. Thus, both the transmitted powers (amplitude) and phases of the powering signals of the power transmitters may be efficiently controlled to provide a high efficiency of power transfer to the power receiving device. However, the transmitted power and the phase are uncorrelated at the power receiving device, because a distance between the power transmitters and the power receiving device are so short that no phase shift is introduced in the inductive coupling of the powering signal from the power transmitter to the power receiving device. Hence, the power distribution control unit may be separately used without necessarily being combined with power transmitters having a driving circuitry being configured to control a phase of a current signal in relation to a phase of a reference oscillator signal. Rather, the power distribution control unit could be combined with any configuration for controlling phase of the powering signals from the power transmitters.

Thus, according to a second aspect, which may be separate from the inventive concept of the first aspect, there is provided a powering apparatus for wireless powering of a power receiving device, said powering apparatus comprising: a plurality of power transmitters configured to provide inductive coupling to the power receiving device; and a power distribution control unit, which is configured to determine an amplitude of the powering signal to be output by each of the power transmitters, wherein the power distribution control unit is configured to determine the amplitude of the powering signals by defining groups of power transmitters among the plurality of power transmitters, and determining an equivalent coupling factor for a virtual combined power transmitter to the power receiving device, wherein the equivalent coupling factor represents a coupling between the power transmitters within a group and the power receiving device with a desired power distribution between the power transmitters within the group, and wherein the desired power distribution is based on coupling factors between each of the power transmitters within the group and the power receiving device and the equivalent coupling factor is based on the coupling factors between each of the power transmitters within the group and the power receiving device and on the desired power distribution.

The features discussed below with regard to the power distribution control unit may be used in the second aspect, separate from the inventive concept of the first aspect, or may be used in combination with the first aspect.

According to an embodiment, the power distribution control unit is configured to recursively define groups of virtual combined power transmitters and determine an equivalent coupling factor for a subsequent level of a virtual combined power transmitter to the power receiving device until a single group of virtual combined power transmitters is determined to represent the plurality of power transmitters.

The determination of equivalent coupling factors for groups may thus be repeated until a single group of virtual combined power transmitter is determined to represent the plurality of power transmitters. Hence, the power distribution control unit allows systematically finding an optimal power distribution among a large number of power transmitters in a small number of steps each reducing the number of power transmitters to be considered by a factor corresponding to the number of power transmitters in each group, such as a factor 2 when pairs of power transmitters are used. Hence, complexity of the control performed by the power distribution control unit, when pairs of power transmitters are used, is in the order of $O(\log_2(N))$, where N is the number of power transmitters, such that the required resources for determining the power distribution increase slowly with the number of power transmitters being used.

According to an embodiment, the power distribution control unit is configured to determine the desired power distribution for the virtual combined power transmitters in the single group representing the plurality of power transmitters and is configured to determine the corresponding power distribution to each power transmitter in the plurality of power transmitters.

Thus, once the desired power distribution for the single group is determined, the power distribution between all groups of virtual combined power transmitters or between groups of power transmitters are also known. A ratio of the total power to be provided to a particular power transmitter may be easily determined as a combination of all the power distributions within groups of virtual combined power transmitters and groups of power transmitters associated with the particular power transmitter.

The powering apparatus may set a total power to be used for powering of the power receiving device. The power (amplitude of the transmitted signal) to be provided to each power transmitter may then be determined using the ratio of the total power as provided by the power distribution control unit. Hence, if the total power provided by the powering apparatus is scaled, the power of each power transmitter may be correspondingly scaled using the ratio of the total power associated with each power transmitter.

According to an embodiment, the power distribution control unit is configured to receive input for determining a coupling factor between each of the plurality of power transmitters and the power receiving device for a prevalent relation between the power transmitters and the power receiving device.

Thus, the power distribution control unit may be configured to communicate with a sensor for determining input related to the coupling factor. The sensor may be arranged at the power receiving device to perform actual measurements of the coupling factor and the power distribution control unit may thus be configured to communicate with the power receiving device for receiving input related to the coupling factor. However, it should be realized that the sensor need not necessarily be arranged at the power receiving device but may rather be arranged in the powering apparatus or even in an additional external unit for determining the input related to the coupling factor. For instance, the sensor may use backscattering or load modulation for determining the coupling factor, but it should be realized that other ways of determining the coupling factor known to the person skilled in the art may alternatively be used.

Further, it is not necessary to determine the actual coupling factor, but rather only a relative coupling factor between different power transmitters and the power receiving device may be determined. The relative coupling factors may be more easily accurately determined compared to determination of actual coupling factors.

According to an embodiment, the power distribution control unit is configured to periodically determine the amplitude of the powering signal to be output by each of the power transmitters to accommodate a dynamically changing relation between the plurality of power transmitters and the power receiving device.

Hence, the powering apparatus is configured to provide an efficient power transfer for changing relations between the plurality of power transmitters and the power receiving device. This allows the powering apparatus to be efficient in a real-time application where the relation between the power transmitters and the power receiving device changes frequently.

An interval between subsequent determinations of the amplitude of the powering signal may be dependent on the application, i.e. on how fast the relation between the power transmitters and the power receiving device changes. In case of the power transmitters and power receiving device being arranged as wearables, a frequency of determination of the amplitude of the powering signal of 1 kHz may typically be sufficient. In other applications when movements occur less frequently a frequency of determination of the amplitude of the powering signal of less than 1 Hz may be sufficient. Such frequencies of determination of the amplitude of the powering signal may ensure that an efficient power transfer is provided in many applications while not significantly affecting power consumption due to the determination of the amplitude of the powering signals by the power distribution control unit.

According to an embodiment, at least the plurality of power transmitters and the oscillator of the powering apparatus are configured to be arranged in a carrier configured to be worn by a person or configured to be arranged in close vicinity to the person.

This enables the powering apparatus to be used with a power receiving device which may also be worn by the person and/or arranged in close vicinity to the person. The carrier may facilitate that the powering apparatus may be provided in relation to the person without causing or minimizing inconvenience to the person.

According to an embodiment, the carrier may be provided as a patch which may be configured to be worn on the skin of the person. This may be useful for arranging the powering apparatus in an appropriate relation to a power receiving device arranged in the person, such as an implanted power receiving device.

According to another embodiment, the carrier may be provided as a belt or strap, which may be configured to be worn around a body part of the person, or the carrier may be integrated in a garment worn by the person. This may provide a convenient manner of wearing the powering apparatus, such that the powering apparatus may be worn for a long time without affecting daily life of the person. This may be useful in powering an implanted or ingested power receiving device, but it may also be useful in powering a power receiving device worn by the person, such as a power receiving device worn within the same belt/strap/garment in which the carrier is arranged.

According to yet another embodiment, the carrier may be configured to be arranged in close vicinity to the person, at least during a period of time. For instance, the carrier may be configured to be arranged on or in a bed stand or within a mattress of a bed such that the powering apparatus may be used for powering the power receiving device while the person is sleeping or lying in bed. Alternatively, the carrier may be configured to be arranged on or in a chair or seat, such as an office chair or car seat, such that the powering apparatus may be used for powering of the power receiving device while the person is sitting in the chair or seat.

According to an embodiment, the powering apparatus is configured for powering of an implanted or ingested power receiving device.

The powering apparatus may be particularly useful for powering an implanted or ingested power receiving device. Such power receiving devices may not be possible to charge using wires, so it is particularly important to provide an efficient wireless power transfer to such power receiving devices.

Implantable or ingestible devices may assume random positions and orientation within a body of the person, such that it is important that the powering apparatus provides efficient power transfer for changing relations between the power transmitters and the power receiving device. Also, it should be realized that if the power transmitters are arranged in a carrier worn by the person, movement by the person may also affect how the power transmitters are related to the implantable or ingestible devices. In particular, for long term use of an implanted or ingested device, extension of battery life of the device is important and hence overall efficiency of power transfer is also important. For instance, replacement of an implanted or ingested device in the person due to end of battery may be highly undesired as it may cause inconvenience to the person or even require surgery.

According to an embodiment, at least the plurality of power transmitters and the oscillator of the powering apparatus are configured to be arranged in a carrier which is configured to define a space in which the powering apparatus is configured to power the power receiving device.

The carrier may thus be shaped such that a particular space is defined in which a power receiving device may be powered. In this regard, the carrier may be arranged to surround a space such that power transmitters are arranged surrounding the space for providing efficient power transfer of the power receiving device arranged in the space. For instance, the carrier may be configured to be arranged in or on pocket walls, e.g. of a garment, such that a power receiving device may be powered when being arranged in the pocket. This could be used for convenient charging of a mobile phone or another power receiving device when arranged in a trouser pocket.

The carrier may not necessarily surround the defined space. Rather, the carrier may be arranged in or on a surface for defining a space in close relation to the surface such as to allow powering of a power receiving device arranged on or close to the surface. For instance, the carrier may be arranged in or on a part of a desk surface to allow powering of power receiving devices placed on the desk surface.

Since the powering apparatus is configured to allow efficient powering of a power receiving device regardless of a position or orientation of the power receiving device in relation to the power transmitters, a user need not carefully arrange the power receiving device in relation to the powering apparatus but may just place the power receiving device somewhere in the space in which the powering apparatus is configured to power the power receiving device and the powering apparatus will ensure that an efficient power transfer is provided.

According to a third aspect of the present inventive concept, there is provided a method for controlling a powering apparatus to provide wireless powering of a power receiving device, said method comprising: provide a reference oscillator signal to a plurality of power transmitters, for each power transmitter, drive a current signal through an inductive element of the power transmitter, wherein a phase of the current signal is controlled in relation to a phase of the reference oscillator signal using a feedback signal of a current through the inductive element such that each of the plurality of power transmitters is configured for outputting a powering signal controlled by a common phase relation to the reference oscillator signal.

Effects and features of this third aspect are largely analogous to those described above in connection with the first aspect. Embodiments mentioned in relation to the first aspect are largely compatible with the third aspect.

Thanks to the current signal of each power transmitter being controlled in relation to a common reference oscillator signal, the output powering signals (magnetic field) from all the power transmitters may be set in phase, such that constructive interference of the powering signals at a power receiving device inductively coupled to the power transmitters may be ensured. This implies that an efficient wireless power transfer may be ensured.

According to an embodiment, the method further comprises: determining an amplitude for each of the power transmitters based on determining a power distribution among the plurality of power transmitters by recursively forming a representation of groups of power transmitters into a virtual combined power transmitter with an equivalent coupling factor.

Thanks to representing a group of power transmitters as a virtual combined power transmitter with an equivalent coupling factor, an optimal power distribution among a large number of power transmitters may be systematically found in a small number of steps each reducing the number of power transmitters to be considered by a factor corresponding to the number of power transmitters in each group. This enables very fast determination of an efficient or optimized power distribution by reducing the complexity of the problem in steps. Thus, the determination of the desired power distribution among a large number of power transmitters may further be performed in an efficient manner.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Figure 1:
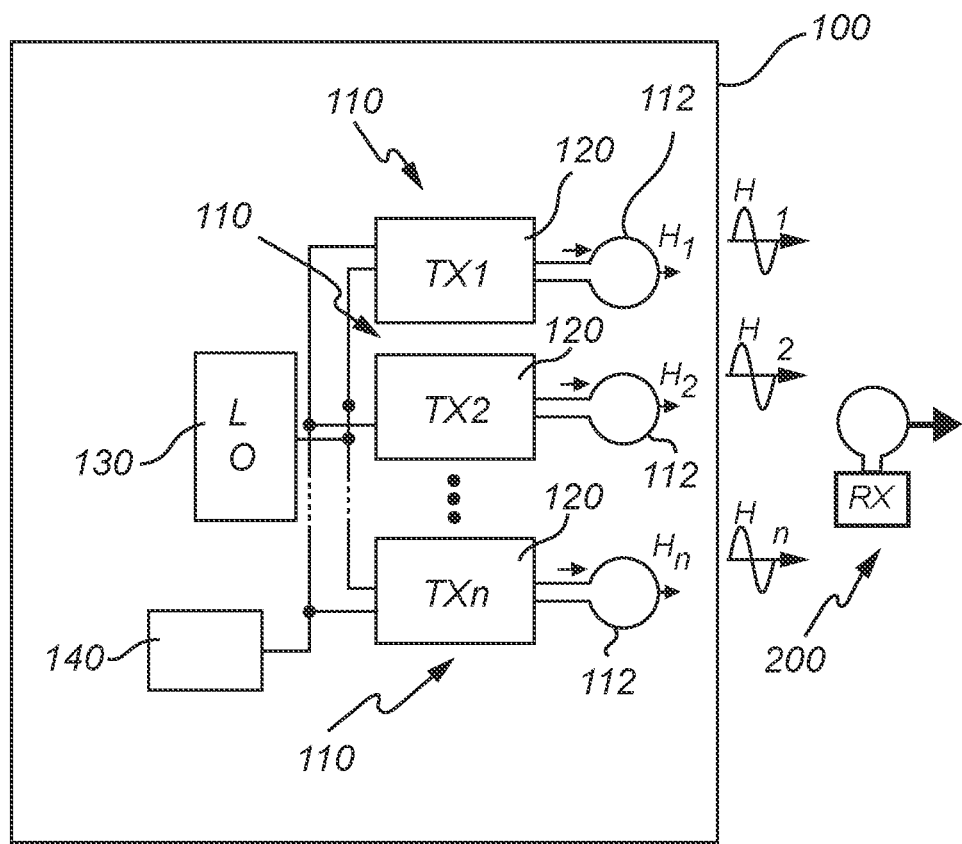
FIG. 1 is a schematic view of a powering apparatus according to an embodiment.

Referring now to FIG. 1, a powering apparatus 100 for wireless powering of a power receiving device 200 will be described. The powering apparatus 100 is configured for powering of the power receiving device 200 through inductive coupling, such that energy is transferred via a magnetic field.

The powering apparatus 100 may be used for providing power to an ingested or implanted device, i.e. a device that is arranged within a body of a person. In such an application, wireless energy transfer may be necessary to maintain a long lifetime of the ingested or implanted device. In powering of the ingested or implanted device, low frequency inductive powering may be advantageously used, due to inertia of the body to the magnetic field, and absence of reflection losses. However, low frequency inductive powering suffers from poor resilience to misalignment in a relation between a power transmitter and a power receiver.

Thus, the powering apparatus 100 comprises a plurality of power transmitters 110, so as to enable compensation for unknown positions and/or orientations of the power receiving device 200 to the power transmitters 110. The power transmitters 110 may have different relations to the power receiving device 200 such that at least some of the power transmitters 110 may always have a good alignment to the power receiving device 200.

Although the powering apparatus 100 may be mainly described herein in relation to a power receiving device 200 being an ingested or implantable device, it should be realized that the powering apparatus 100 may alternatively be used in other applications, such as for powering a mobile phone or another portable device.

Each power transmitter 110 may comprise an inductive element 112 for providing an inductive coupling to the power receiving device 200. The inductive element 112 may be any component that generates a magnetic field in response to a change of a current flowing through the inductive element 112. For instance, the inductive element 112 may comprise a wire forming a coil, e.g. around a core, or a loop.

Each power transmitter 110 may further comprise a driving circuitry 120 for providing a current signal through the inductive element 112. Hence, the current signal provided by the driving circuitry 120 will cause a powering signal in the form of a magnetic field to be generated by the inductive element 112, whereby the powering signal may reach an inductive element at the power receiving device 200 for energy transfer to the power receiving device 200.

The driving circuitry 120 may be configured to provide an alternating current signal, so that the changing current signal causes continuous energy transfer from the inductive element 112 by the magnetic field. The alternating current signal may be characterized by a phase, defining a moment in time of a peak of the current signal, and an amplitude, related a magnitude of the peak of the current signal. In order to ensure that an efficient, preferably optimal, energy transfer is provided to the power receiving device 200, the phase and amplitude of the current signal of each power transmitter 110 should be controlled. The current signal will cause a corresponding magnetic field to be generated by the inductive element 112 of the respective power transmitters 110.

It is realized that for the powering apparatus 100, which provides an inductive coupling to the power receiving device 200, the powering apparatus 100 will be arranged in a near-field relation to the power receiving device 200 such that a distance between the power transmitters 110 and the power receiving device 200 is so small that no phase shift is introduced in the inductive coupling of the powering signal from the power transmitter 110 to the power receiving device 200. This implies that the phase and the amplitude of the current signal are uncorrelated at the power receiving device 200 and the control of the phase and the amplitude of the current signal may therefore be handled separately.

Below, control of phase of the current signals of the power transmitters 110 and control of amplitude (power) of the current signals of the power transmitters 110 will be discussed. It should be realized that the control of phase may be combined with the control of amplitude, but these controls may alternatively be separately provided such that the described embodiments for controlling phase need not necessarily be combined with any of the embodiments of for controlling amplitude, and vice versa.

The powering apparatus 100 may comprise an oscillator 130 configured to generate an oscillator signal having a desired frequency corresponding to the frequency to be used for inductive powering by the powering apparatus 100. The oscillator 130 may thus provide a reference oscillator signal and the oscillator 130 may further be connected to each of the power transmitters 110 such that the same reference oscillator signal may be provided to each of the power transmitters 110.

The driving circuitry 120 of each power transmitter 110 may thus be configured to receive the reference oscillator signal for controlling timing of the current signal provided by the driving circuitry 120. The reference oscillator signal may thus function as a clock for synchronizing the current signals of all the power transmitters 110.

The driving circuitry 120 may be configured to set a desired relation between the current signal provided by the driving circuitry 120 and the reference oscillator signal. Below, the driving circuitry 120 will be mainly described as being configured to bring the current signal in phase with the reference oscillator signal. However, it should be realized that the driving circuitry 120 may be configured to set another phase relation between the current signal and the reference oscillator signal, such as a 180° phase difference.

The driving circuitries 120 of the power transmitters 110 may be configured to define a common phase relation between the respective current signal and the reference oscillator signal. This implies that the current signals of the driving circuitries 120 may be in phase with each other. This also implies that the powering signals output by the respective power transmitters 110 will be in phase with each other, because the magnetic field generated by an inductive element 112 will be in phase with the current signal through the inductive element 112.

The driving circuitry 120 of each power transmitter 130 may further be configured to receive a feedback signal of a current through the inductive element 112. Thus, thanks to the driving circuitry 120 receiving the feedback signal and the reference oscillator signal, the driving circuitry 120 may determine a phase relation between the current signal and the reference oscillator signal such that the current signal may be adapted to be set in the desired phase relation to the reference oscillator signal.

The current through the inductive element 112 may change depending on a loading of the power transmitter 110. Further, a change in position and/or orientation of the power receiving device 200 may affect the loading of the power transmitter 110. Thus, the feedback signal may provide information to the driving circuitry 120 for adapting the current signal to changes in position and/or orientation of the power receiving device 200 and ensure that the powering signals of the power transmitters 110 are maintained in phase with each other.

Figure 2:
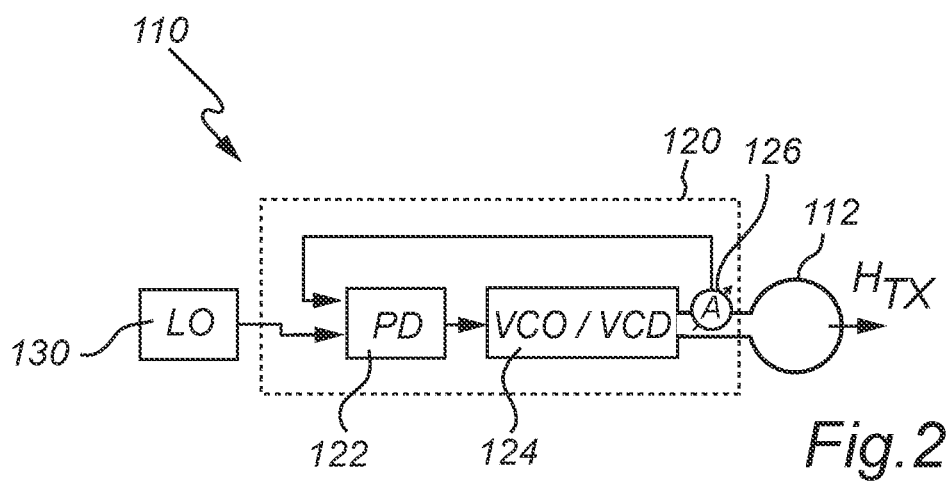
FIG. 2 is a schematic view of a driving circuitry of a power transmitter according to an embodiment.

Referring now to FIG. 2, an embodiment of the driving circuitry 120 will be described in further detail.

As schematically shown in FIG. 2, the driving circuitry 120 may form a phase locking loop or a delay locking loop for locking the current signal to the reference oscillator signal, bringing the current signal in phase with the reference oscillator signal.

The driving circuitry 120 may comprise a phase detector 122, which receives the reference oscillator signal and the feedback signal as input. The phase detector 122 may be configured to compare the reference oscillator signal to the feedback signal and provide an output which is proportional to a phase difference between the feedback signal and the reference oscillator signal.

The output from the phase detector 122 may form a control signal which, in case of the driving circuitry 120 forming a phase locking loop, may be provided to a voltage controlled oscillator (VCO) 124. In case of the driving circuitry 120 forming a delay locking loop, the output from the phase detector 122 may provide a control signal to a delay unit, which may for instance comprise a voltage controlled delay (VCD) 124.

In case of the driving circuitry 120 forming a phase locking loop, the VCO 124 thus receives an input representing the phase difference between the feedback signal and the reference oscillator signal and may use this to control the output phase by the VCO 124. The VCO 124 may output a current signal to the inductive element 112 of the power transmitter 110. Hence, the VCO 124 may be controlled to correct an error (phase difference) between the current signal and the reference oscillator signal in order to ensure that the current signal is in phase with the reference oscillator signal.

In case of the driving circuitry 120 forming a delay locking loop, the delay unit may thus be configured to receive the control signal from the phase detector 122 and may be configured to provide a delay based on the control signal for bringing the current signal for driving the inductive element 112 in phase with the reference oscillator signal.

The delay unit may for instance comprise a VCD 124, or a digital delay line for providing the delay. The delay unit may thus, based on the control signal from the phase detector 122, ensure that the current signal is held in phase with the reference oscillator signal.

The driving circuitry 120 may further comprise an Ampere meter 126 which is configured to measure an actual current through the inductive element 112 of the power transmitter 110. The Ampere meter 126 may generate a feedback signal that is proportional to the current through the inductive element 112 and the output powering signal from the power transmitter 110. This feedback signal may be fed back to the phase detector 122 as described above, thereby closing the phase locking loop or the delay locking loop, respectively.

Hence, using phase locking loops or delay locking loops as described above, the power transmitters 110 may be controlled to provide output powering signals that are in phase with each other. However, it should be realized that the phase locking loop or the delay locking loop may be implemented in other ways and also that the driving circuitry may be differently configured, not necessarily including a phase locking loop or a delay locking loop, for controlling the powering signals to be in phase with each other.

According to another embodiment, the driving circuitry 120 of each power transmitter 110 may comprise a digital control unit for controlling a phase of the current signal in relation to a phase of the reference oscillator signal.

The digital control unit may comprise a current sensor that is configured to digitally read the current through the inductive element 112. Thus, the feedback signal may be acquired using the current sensor.

The digital control unit may further comprise a phase controller which is configured to receive the feedback signal and to determine a control signal for changing phase of the current signal for providing a desired phase relation between the current signal and the reference oscillator signal.

Referring again to FIG. 1, the powering apparatus 100 may further comprise a power distribution control unit 140. The power distribution control unit 140 may be configured to determine and control how power transmitted by the powering apparatus 100 is to be distributed among the plurality of power transmitters 110. As the power is proportional to a square of the amplitude, a determination of a power to be output by a power transmitter 110 may be directly converted to the amplitude to be used for the powering signal.

The power transmitters 110 have different relations to the power receiving device 200 and the efficiency of power transfer from a power transmitter 110 to the power receiving device 200 will therefore differ among the power transmitters 110. Hence, in order to provide a good efficiency of power transfer from the plurality of power transmitters 110, power should not be divided equally between the power transmitters 110.

The power distribution control unit 140 is configured to reduce complexity of the problem of determining an optimal power distribution among a plurality of different power transmitters 110 so as to enable the optimal power distribution to be determined.

Figure 3:
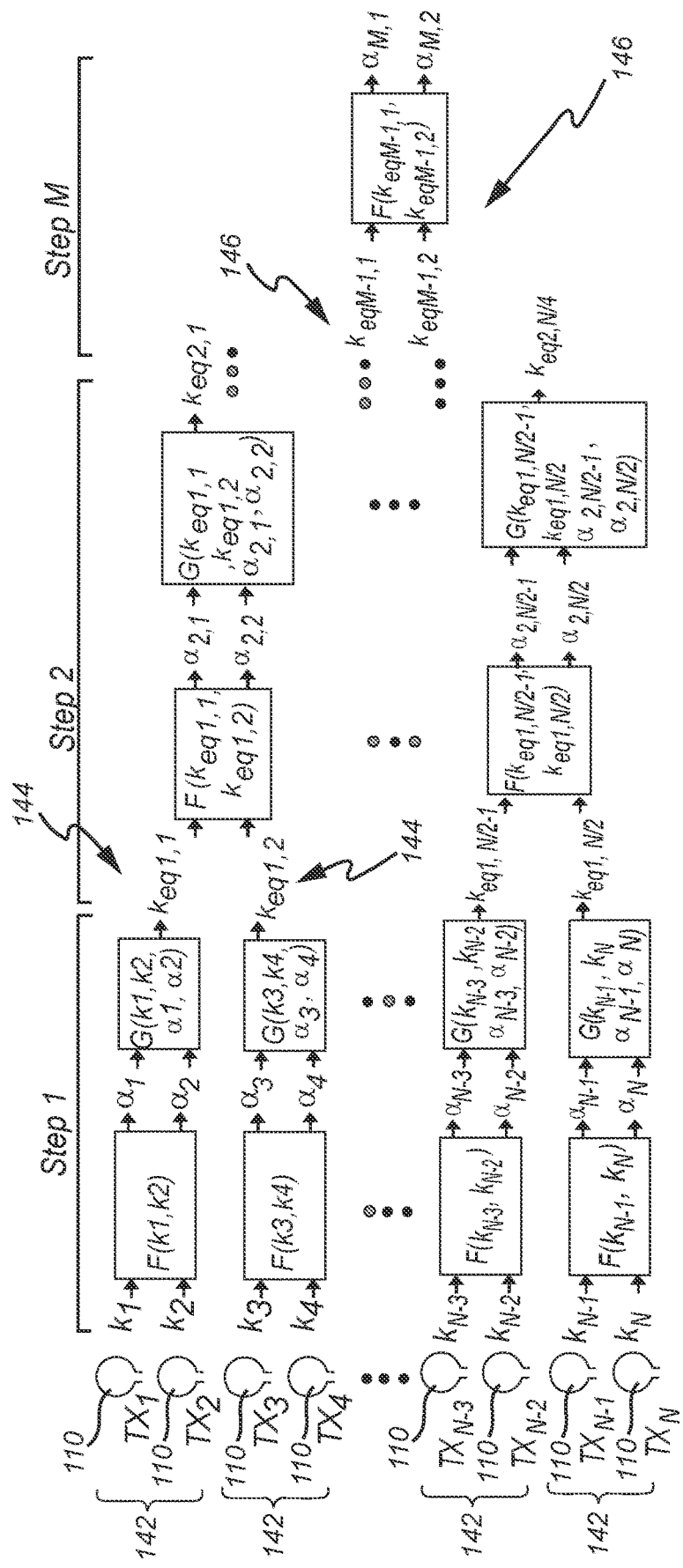
FIG. 3 is a scheme illustrating calculations performed by a power distribution control unit for determining a power distribution among a plurality of power transmitters.

Referring now to FIG. 3, which illustrates calculations performed by the power distribution control unit 140, the power distribution control unit 140 is configured to define groups 142 of power transmitters 110. As shown in FIG. 3, the power distribution control unit 140 is configured to group power transmitters 110 in pairs 142 and the following discussion will thus be made in relation to groups 142 of two power transmitters 110. However, it should be realized that the scheme discussed below for determining an amplitude for each of the power transmitters 110 may be used instead based on groups 142 of more than two power transmitters 110.

Each power transmitter 110 in the pair 142 has a transmitter-receiver coupling factor $k_i$ to the power receiving device 200 and the power distribution control unit 140 may be configured to receive input of the respective coupling factors. The power distribution control unit 140 may further be configured to determine a desired power distribution between the power transmitters 110 in each pair 142 based on the coupling factors associated with the power transmitters 110 in the respective pair, such that a first power transmitter is to be provided with a ratio $a_1$ of the power provided to the pair 142 and a second power transmitter is to be provided with a ratio $a_2$ of the power provided to the pair 142. Furthermore, based on the coupling factors $k_1$, $k_2$ of the first and the second power transmitter 110 in each pair 142 and the desired power distribution between the first and the second power transmitter 110 represented by $a_1$, $a_2$, the power distribution control unit 140 may be configured to represent a virtual combined power transmitter 144 by an equivalent coupling factor. The equivalent coupling factor for the virtual combined power transmitter 144 may be calculated by using a mathematical function, such that the equivalent coupling factor $k_{EQ}$ is determined as $k_{EQ}=G(k_1, k_2, a_1, a_2)$.

In FIG. 3, there is illustrated N number of transmitters, denoted as $TX_i$, where i is a number from 1 to N. Each power transmitter $TX_i$ is represented to have a transmitter-receiver coupling factor $k_i$ to the power receiving device 200. Further, the ratios of the power of respective pairs are denoted $a_j$, where j is a number from 1 to N and two ratios are associated with each pair of power transmitters. The equivalent coupling factor $k_{EQ}$ is represented as $k_{eql,m}$, where eq is short for equivalent and l is an integer number representing in which level or step of forming a virtual combined power transmitter 144 the equivalent coupling factor is determined, and m is an integer number to represent a counter of the virtual combined power transmitters 144 within the level or step. Further, the ratio of the power of pairs of virtual combined power transmitters is denoted $a_{s,t}$, where s is an integer number representing in which level or step of forming a virtual combined power transmitter 144 the ratio is determined, and t is an integer number to represent a counter of ratios being determined within the level or step.

The power control distribution unit 140 may thus be configured to determine the equivalent coupling factor for virtual combined power transmitters 144, wherein the number of virtual combined power transmitters 144 is half of the number of power transmitters 110. This process may be performed recursively in several levels until a single pair of virtual combined power transmitters 146 is determined to represent the entire plurality of power transmitters 110.

The power distribution control unit 140 may further be configured to determine a desired power distribution between the virtual combined power transmitters 146 in the single pair based on the equivalent coupling factors associated with the virtual combined power transmitters 146. Then, the power distribution control unit 140 may determine the ratio of power for each power transmitter 110 of a total power to be provided to the entire plurality of power transmitters 110 by combining the ratios assigned to the power transmitter 110 in all the pairs of power transmitters/virtual combined power transmitters.

Thanks to reducing the complexity of the problem by determining the power distribution within pairs of power transmitters 110 and defining virtual combined power transmitters 144, 146, the power distribution may be determined by iteration in M=$\log_2$(N) steps, wherein N is the number of power transmitters 110. Hence, complexity of the determining of the power distribution performed by the power distribution control unit 140 is in the order of O $\log_2$(N).

As mentioned above, the power distribution control unit 140 receives input of the respective coupling factors for each power transmitter 110. The respective coupling factors may be determined in numerous ways. However, since the power distribution control unit 140 is to determine a distribution of power between power transmitters, i.e. a relation between the power provided to the power transmitters, it is sufficient that relative coupling factors are determined, and it may not be necessary to determine actual coupling factors. This may simplify the determination of the coupling factors.

The power distribution control unit 140 may be configured to communicate with a sensor for receiving input related to the coupling factor. The sensor may be arranged at the power receiving device 200 to perform actual measurements of the coupling factor and the power distribution control unit 140 may thus be configured to communicate with the power receiving device 200 for receiving input related to the coupling factor. However, it should be realized that the sensor need not necessarily be arranged at the power receiving device 200 but may rather be arranged in the powering apparatus 100 or even in an additional external unit for determining the input related to the coupling factor. For instance, the sensor may use backscattering or load modulation for determining the coupling factor, but it should be realized that other ways of determining the coupling factor known to the person skilled in the art may alternatively be used.

Figure 4:
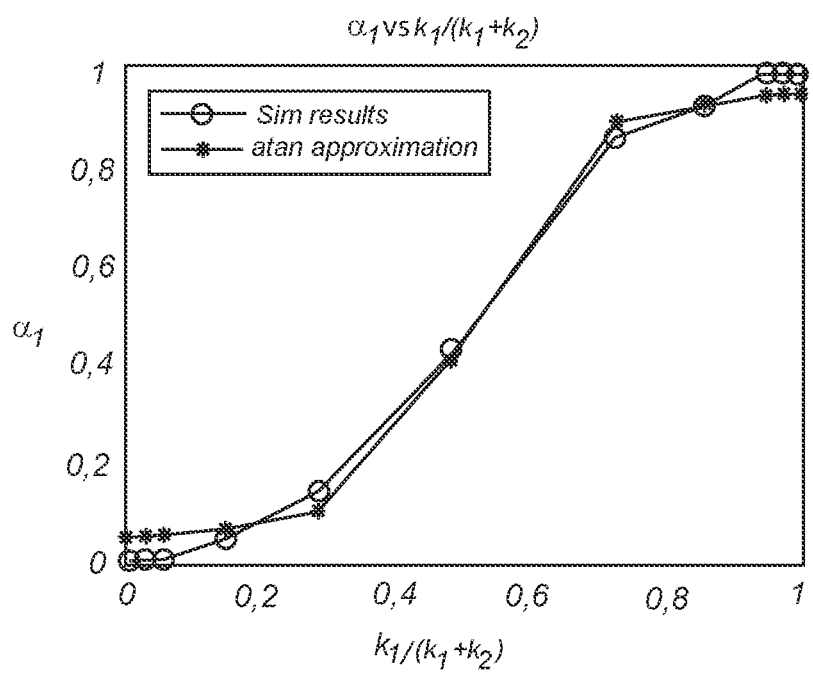
FIG. 4 is a graph illustrating relation between desired power distribution ratios between power transmitters in a pair and coupling factors associated with the power transmitters and a power receiving device.

Referring now to FIG. 4, the power distribution control unit 140 may further be configured to determine desired power distribution ratios $a_1$, $a_2$ between the power transmitters 110 in each pair 142 based on the coupling factors $k_1$, $k_2$ associated with the power transmitters 110 in the respective pair. The desired power distribution ratios $a_1$, $a_2$ may be determined by calculation using a power distribution function such that $a_1$=F ($k_1$, $k_2$). As shown in FIG. 4, the power distribution function may be represented based on simulation results, relating the power distribution ratios $a_1$, $a_2$ to the coupling factors $k_1$, $k_2$. For instance, the power distribution function may be represented by a look-up table such that, in order to speed up processing, the power distribution ratio $a_1$ may be determined by look up in the look-up table. The relation between the power distribution ratio $a_1$ to be assigned to the first power transmitter and a relative coupling factor $k_1/(k_1+k_2)$ of the first power transmitter within the pair is illustrated in FIG. 4. However, it should be realized that the power distribution function may alternatively be defined by a function approximating the simulation results, such that the power distribution ratio $a_1$ to be assigned to the first power transmitter may be determined by calculating the function as $$\alpha_1 = F(k_1, k_2) = \Delta * \arctan\left(\Gamma * \left(\frac{k_1}{(k_1+k_2)}\right) + \Theta\right),$$

wherein $\Delta$, $\Gamma$, and $\Theta$ are parameters that may be numerically fitted beforehand.

Furthermore, the power distribution ratio $a_2$ to be assigned to the second power transmitter in the pair may be determined as $a_2=1-a_1$.

After the desired power distribution is calculated, the pair of power transmitters may be modeled as a single virtual combined power transmitter which induces a voltage $V_{IND}$ to the power receiving device 200 equal to:

$$V_{IND} = j\omega \sqrt{\frac{P_{tot}}{R_{TX}}} \left[M_1 \sqrt{\alpha_1} + M_2 \sqrt{\alpha_2}\right],$$

wherein j is the imaginary unit, $\omega$ is an angular frequency, $P_{TOT}$ is the total power of the pair of power transmitters, $R_{TX}$ is a resistance of the power transmitters, $M_1$ is a mutual inductance of the first power transmitter in the pair of power transmitters and the power receiving device represented as $M_1=k_1*\sqrt{L_{TX}*L_{RX}}$, where $L_{TX}$ is an inductance of the power transmitters and $L_{RX}$ is an inductance of the power receiving device, and $M_2$ is a mutual inductance of the second power transmitter in the pair of power transmitters and the power receiving device represented as $M_2=k_2*\sqrt{L_{TX}*L_{RX}}$.

Based on such model of the virtual combined power transmitter 144, it is possible to extract the equivalent coupling factor $k_{EQi,j}$. The equivalent coupling factor $k_{EQ}$ may be calculated as follows:

$$k_{EQi,j} = G(k_1, k_2, \alpha_1, \alpha_2) = \frac{1}{\sqrt{L_{TX}L_{RX}}} \left[M_1 \sqrt{\alpha_1} + M_2 \sqrt{\alpha_2}\right],$$

wherein i is an index representing the step in the recursion of forming pairs of power transmitters/virtual combined power transmitters at which the $k_{EQ}$ is calculated, j is an index refers to the pair of power transmitters, $L_{TX}$ is an inductance of the power transmitters and $L_{RX}$ is an inductance of the power receiving device 200.

The power distribution control unit 140 may be configured to periodically determine the amplitude of the powering signal to be output by each of the power transmitters 140 to adapt the power distribution between the power transmitters 110 to a dynamically changing relation between the plurality of power transmitters 110 and the power receiving device 200.

Since the power distribution control unit 140 may determine the power distribution quickly, the power distribution among the power transmitters 110 may be updated to handle changes in relations between the plurality of power transmitters 110 and the power receiving device 200 in real-time.

A frequency of performing determinations of the amplitude of the powering signal may be dependent on the application, i.e. on how fast or often the relation between the power transmitters 110 and the power receiving device 200 may be expected to change. In case of the power transmitters 110 and power receiving device 200 being arranged as wearables, a frequency of determination of the amplitude of the powering signal of 1 kHz may typically be sufficient. In other applications when movements occur less frequently a frequency of determination of the amplitude of the powering signal of less than 1 Hz may be sufficient. Such frequencies of determination of the amplitude of the powering signal may ensure that an efficient power transfer is provided in many applications while not significantly affecting power consumption due to the determination of the amplitude of the powering signals by the power distribution control unit 140.

The power distribution control unit 140 may be implemented as a general-purpose processor, such as a central processing unit, which may execute the instructions of one or more computer programs in order to perform operations of the power distribution control unit 140.

However, the power distribution control unit 140 may alternatively be implemented as a digital signal processor, which may be adapted to efficiently process the mathematical algorithms of the power distribution control unit 140.

The power distribution control unit 140 may alternatively be implemented as firmware arranged e.g. in an embedded system, or as a specifically designed processing unit, such as an Application-Specific Integrated Circuit (ASIC) or a Field-Programmable Gate Array (FPGA), which may be configured to implement functionality for performing the operations of the power distribution control unit 140.

Figure 5:
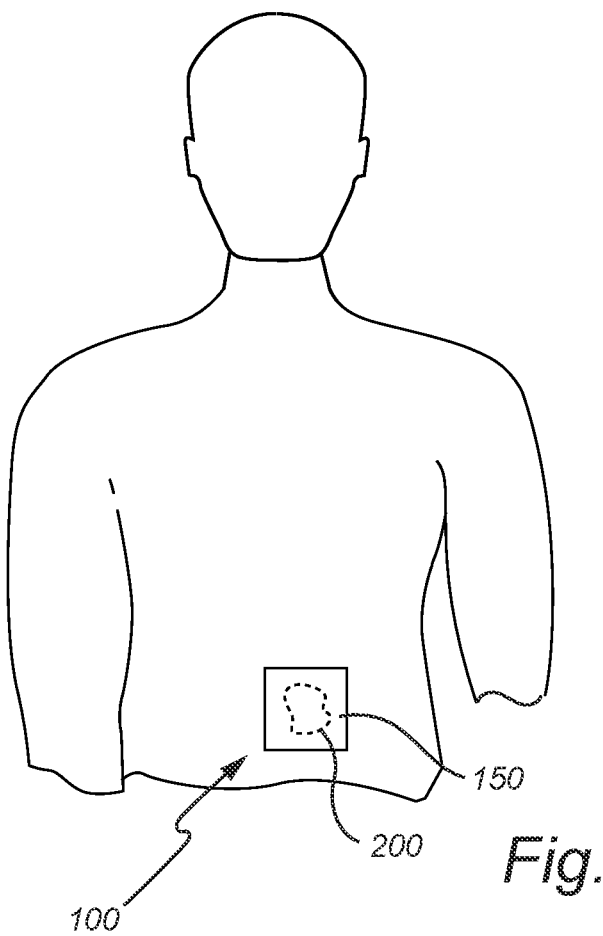
FIG. 5 is a schematic view of a powering apparatus configured to be worn by a person according to an embodiment.

Referring now to FIG. 5, the powering apparatus 100 may comprise a carrier 150 configured to be worn by a person. As shown in FIG. 5, the carrier 150 may be provided as a patch which may be configured to be worn on the skin of the person. This may be useful for arranging the powering apparatus 100 in an appropriate relation to an implanted or ingested power receiving device 200.

According to another embodiment, the carrier may be provided as a belt or strap, which may be configured to be worn around a body part of the person, or the carrier may be integrated in a garment worn by the person. This may provide a convenient manner of wearing the powering apparatus 100, such that the powering apparatus 100 may be worn for a long time without affecting daily life of the person and may also be useful for powering an implanted or ingested power receiving device 200.

The powering apparatus 100 may be configured to continuously provide the power receiving device 200 with power to ensure that the power receiving device 200 remains operational.

As the powering apparatus 100 may be arranged in a carrier 150 to be worn, the powering apparatus 100 may be provided with a battery (not shown) for providing power of the powering apparatus 100. The battery of the powering apparatus 100 may also need to be charged intermittently. The charging of the battery of the powering apparatus 100 may be provided through a wire or wirelessly. For instance, the battery of the powering apparatus 100 may be charged using circuitry which may be embedded/arranged in relation to a bed, such that the battery of the powering apparatus 100 may be charged when the person wearing the powering apparatus 100 is lying in bed.

Figure 6:
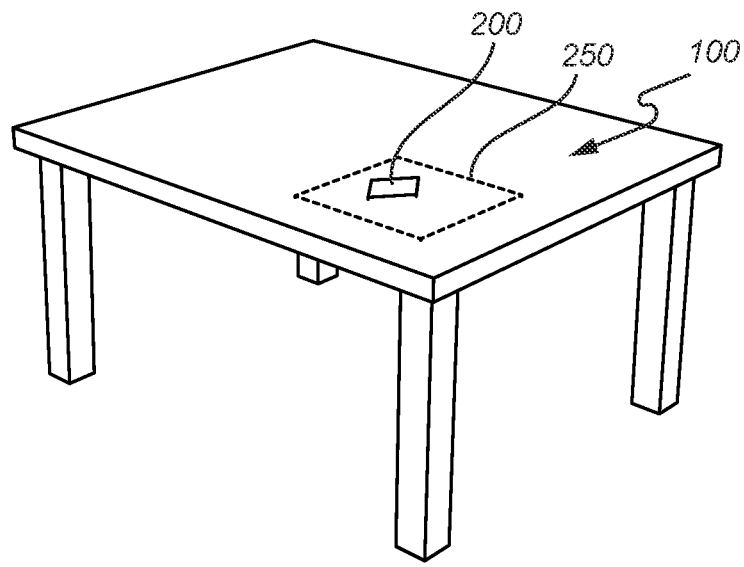
FIG. 6 is a schematic view of a powering apparatus configured to be arranged in a desk surface according to an embodiment.

Referring now to FIG. 6, the powering apparatus 100 may alternatively comprise a carrier 250 for arranging the power transmitters 110 in the carrier 250 so as to define a space in relation to the carrier 250 in which the powering apparatus 100 is configured to power the power receiving device 200.

In this regard, the carrier 250 may be arranged to surround a space such that power transmitters 110 are arranged surrounding the space for providing efficient power transfer of the power receiving device 200 arranged in the space. For instance, the carrier 250 may be configured to be arranged in or on pocket walls, e.g. of a garment, such that a power receiving device 200 may be powered when being arranged in the pocket. This could be used for convenient charging of a mobile phone or another power receiving device 200 when arranged in a trouser pocket.

However, as illustrated in FIG. 6, the carrier 250 may not necessarily surround the defined space. Rather, the carrier 250 may be arranged in or on a surface for defining a space in close relation to the surface such as to allow powering of a power receiving device 200 arranged on or close to the surface. As shown in FIG. 6, the carrier 250 may be integrated in a desk surface to allow powering of power receiving devices 200 placed on the desk surface.

Since the powering apparatus is configured to allow efficient powering of the power receiving device 200 regardless of a position or orientation of the power receiving device 200 in relation to the power transmitters 100, the power receiving device 200 may be placed arbitrarily in the space in which the powering apparatus 100 is configured to power the power receiving device 200 and the powering apparatus 100 will ensure that an efficient power transfer is provided. This provides a convenience to the user who does not need to carefully place the power receiving device 200 to be charged.

Figure 7:
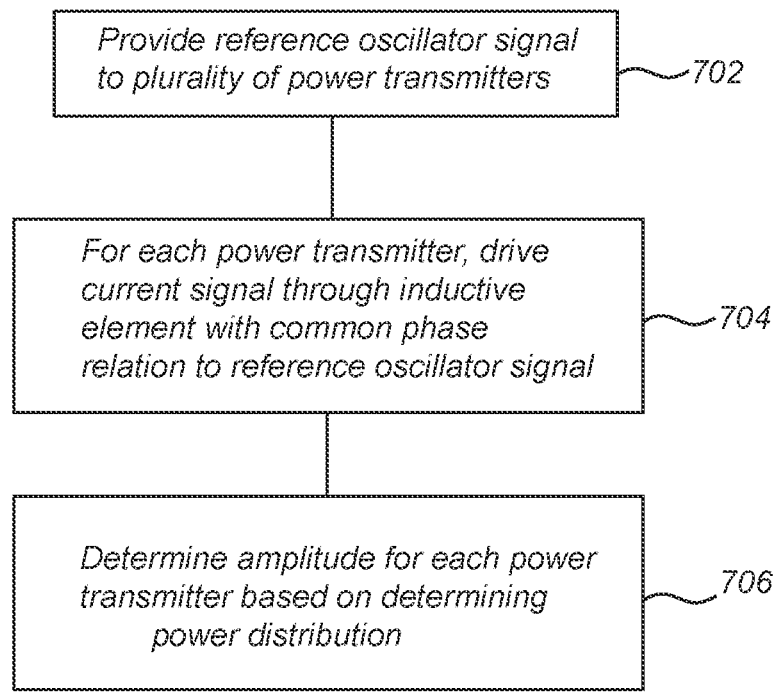
FIG. 7 is a flow chart of a method according to an embodiment.

Referring now to FIG. 7, a method for controlling a powering apparatus 100 to provide wireless powering of a power receiving device 200 will be described.

The method comprises providing 702 a reference oscillator signal to a plurality of power transmitters 110. Thanks to the same reference oscillator signal being provided to the power transmitters 110, the plurality of power transmitters 110 may be synchronized.

The method further comprises, for each power transmitter 110, driving 704 a current signal through an inductive element 112 of the power transmitter 110, wherein a phase of the current signal is controlled in relation to a phase of the reference oscillator signal. The driving of the current signal may ensure that a common phase relation is provided for the current signal of all the power transmitters 110 to the reference oscillator signal. The driving of the current signal may use a feedback signal of a current through the inductive element 112 in order to ensure that the plurality of power transmitters 110 are driven by current signals and thereby output powering signals controlled by a common phase relation to the reference oscillator signal.

The method may further comprise determining 706 an amplitude for each of the power transmitters 110 based on determining a power distribution among the plurality of power transmitters 110 for providing an efficient powering of the power receiving device 200 by recursively forming a representation of pairs 142 of power transmitters 110 into a virtual combined power transmitter 144 with an equivalent coupling factor.

In the above the inventive concept has mainly been described with reference to a limited number of examples. However, as is readily appreciated by a person skilled in the art, other examples than the ones disclosed above are equally possible within the scope of the inventive concept, as defined by the appended claims.

For instance, the powering apparatus 100 has been described above as comprising a carrier 150 configured to be worn by a person. However, it should be realized that the carrier may alternatively be configured to be arranged in close vicinity to the person, at least during a period of time. For instance, the carrier may be configured to be arranged on or in a bed stand or within a mattress of a bed such that the powering apparatus 100 may be used for powering the power receiving device 200 while the person is sleeping or lying in bed. In another embodiment, the carrier may be configured to be arranged on or in a chair or seat, such as an office chair or car seat, such that the powering apparatus 100 may be used for powering of the power receiving device 200 while the person is sitting in the chair or seat.

The invention claimed is:

1. A powering apparatus for wireless powering of a power receiving device, said powering apparatus comprising:
a plurality of power transmitters configured to provide inductive coupling to the power receiving device, wherein each power transmitter comprises an inductive element and a driving circuitry connected to the inductive element for providing a current signal for driving the inductive element;
an Ampere meter in direct electrical contact with the inductive elements, wherein the Ampere meter is configured to measure the current flowing through the inductive elements;
an oscillator configured to provide a reference oscillator signal,
wherein the inductive element is configured to power the power receiving device through an inductive coupling to the power receiving device, and
wherein the driving circuitry of each power transmitter is configured to receive the reference oscillator signal and a feedback signal that includes the measured current for controlling a phase of the current signal in relation to a phase of the reference oscillator signal, each of the plurality of power transmitters being configured for outputting a powering signal controlled by a common phase relation to the reference oscillator signal; and
a power distribution control unit, which is configured to determine an amplitude of the powering signal to be output by each of the power transmitters,
wherein the power distribution control unit is configured to receive input for determining a coupling factor between each of the plurality of power transmitters and the power receiving device for a prevalent relation between the power transmitters and the power receiving device,
wherein the power distribution control unit is configured to determine power distribution ratios within a group of power transmitters as a function of the coupling factors associated with each power transmitter in the group, and to determine an equivalent coupling factor for the group of power transmitters as a function of the determined power distribution ratios and the coupling factors associated with each power transmitter in the group,
wherein the power distribution control unit is further configured to, in recursive steps, combine groups of power transmitters, wherein a combined group comprises two or more groups of power transmitters from a previous recursive step, wherein the power distribution control unit is configured to determine power distribution ratios of the groups of power transmitters within the combined group as a function of the equivalent coupling factors associated with each group of power transmitters, and to determine an equivalent coupling factor for the combined group as a function of the determined power distribution ratios of the groups of power transmitters and the equivalent coupling factors associated with each group of power transmitters,
wherein the power distribution control unit is configured to perform the recursive steps of combining groups of power transmitters until a single combined group comprising two or more groups of power transmitters is formed representing all of the plurality of power transmitters, wherein the power distribution control unit is configured to determine power distribution ratios of the groups of power transmitters within the single combined group as a function of the equivalent coupling factors associated with each group of power transmitters,
wherein the power distribution control unit is further configured to determine the amplitude to be output by each of the power transmitters as a function of the power distribution ratios associated with the power transmitter for each recursive step.

2. The powering apparatus according to claim 1, wherein the driving circuitry of each power transmitter comprises a phase locking loop or a delay locking loop for locking the current signal to the reference oscillator signal.

3. The powering apparatus according to claim 2, wherein the phase locking loop or the delay locking loop comprises a phase detector, which is configured to receive the feedback signal of the current through the inductive element and the reference oscillator signal and to output a control signal in dependence of a phase difference between the feedback signal and the reference oscillator signal.

4. The powering apparatus according to claim 3, wherein the phase locking loop further comprises a voltage controlled oscillator, which is configured to receive the control signal from the phase detector and is configured to generate the current signal for driving the inductive element or the delay locking loop may further comprise a delay unit, which is configured to receive the control signal from the phase detector and is configured to provide a delay based on the control signal for bringing the current signal for driving the inductive element.

5. The powering apparatus according to claim 2, wherein the phase locking loop or the delay locking loop includes the Ampere meter.

6. The powering apparatus according to claim 1, wherein the power distribution control unit is configured to periodically determine the amplitude of the powering signal to be output by each of the power transmitters to accommodate a dynamically changing relation between the plurality of power transmitters and the power receiving device.

7. The powering apparatus according to claim 1, wherein at least the plurality of power transmitters and the oscillator of the powering apparatus are configured to be arranged in a carrier configured to be worn by a person or configured to be arranged in close vicinity to the person.

8. The powering apparatus according to claim 1, wherein at least the plurality of power transmitters and the oscillator of the powering apparatus are configured to be arranged in a carrier which is configured to define a space in which the powering apparatus is configured to power the power receiving device.

9. The powering apparatus according to claim 1, wherein each group includes a first power transmitter and a second power transmitter, wherein the power distribution control unit is configured to determine the power distribution ratio $a_1$ to the first power transmitter within the group of power transmitter by the function:

$$\alpha_1 = \Delta * \arctan\left(\Gamma * \left(\frac{k_1}{(k_1 + k_2)}\right) + \Theta\right),$$

where $\Delta$, $\Gamma$, $\Theta$ are numerically fitted parameters, $k_1$ is the coupling factor of the first power transmitter and $k_2$ is the coupling factor of the second power transmitter.

10. The powering apparatus according to claim 1, wherein the equivalent coupling factor $k_{EQ}$ for a group of a first power transmitter and a second power transmitter with a first coupling factor $k_1$ associated with the first power transmitter and a second coupling factor $k_2$ associated with the second power transmitter is determined by the function $$k_{EQ} = \frac{1}{\sqrt{L_{TX}L_{RX}}}\left[M_1\sqrt{\alpha_1} + M_2\sqrt{\alpha_2}\right],$$

where $L_{TX}$ is an inductance of the power transmitters and $L_{RX}$ is an inductance of the power receiving device, $a_1$ is the power distribution ratio to the first power transmitter and $a_2$ is the power distribution ratio to the second power transmitter, and $$M_1 = k_1 * \sqrt{L_{TX} * L_{RX}} \text{ and } M_2 = k_2 * \sqrt{L_{TX} * L_{RX}}.$$

11. A method for controlling a powering apparatus to provide wireless powering of a power receiving device, said method comprising:
providing a reference oscillator signal to a plurality of power transmitters, for each power transmitter;
driving a current signal through an inductive element of each power transmitter, wherein the inductive element is configured to power the power receiving device through an inductive coupling to the power receiving device, wherein a phase of the current signal is controlled in relation to a phase of the reference oscillator signal using a feedback signal that includes a current flowing through the inductive element such that each of the plurality of power transmitters is configured for outputting a powering signal controlled by a common phase relation to the reference oscillator signal; and
measuring the current flowing through each inductive element with an Ampere meter in direct electrical contact with the inductive elements;
generating the feedback signal;
determining an amplitude of the powering signal to be output by each of the power transmitters based on receiving input for determining a coupling factor between each of the plurality of power transmitters and the power receiving device for a prevalent relation between the power transmitters and the power receiving device,
wherein said determining of the amplitude comprises determining power distribution ratios within a group of power transmitters as a function of the coupling factors associated with each power transmitter in the group, and determining an equivalent coupling factor for the group of power transmitters as a function of the determined power distribution ratios and the coupling factors associated with each power transmitter in the group;
in recursive steps, combining groups of power transmitters, wherein a combined group comprises two or more groups of power transmitters from a previous recursive step, determining power distribution ratios of the groups of power transmitters within the combined group as a function of the equivalent coupling factors associated with each group of power transmitters, and determining an equivalent coupling factor for the combined group as a function of the determined power distribution ratios of the groups of power transmitters and the equivalent coupling factors associated with each group of power transmitters;
performing the recursive steps of combining groups of power transmitters until a single combined group comprising two or more groups of power transmitters is formed representing all of the plurality of power transmitters, and determining power distribution ratios of the groups of power transmitters within the single combined group as a function of the equivalent coupling factors associated with each group of power transmitters; and
determining the amplitude to be output by each of the power transmitters as a function of the power distribution ratios associated with the power transmitter for each recursive step.

\* \* \* \* \*